United States Patent
Spaulding et al.

(10) Patent No.: US 11,585,892 B1
(45) Date of Patent: Feb. 21, 2023

(54) CALIBRATION FOR MULTI-CHANNEL IMAGING SYSTEMS

(71) Applicants: Jonathon D. Spaulding, Mountain View, CA (US); Gregory E. Rogers, San Jose, CA (US); Jian Wang, Cupertino, CA (US)

(72) Inventors: Jonathon D. Spaulding, Mountain View, CA (US); Gregory E. Rogers, San Jose, CA (US); Jian Wang, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 185 days.

(21) Appl. No.: 16/862,102

(22) Filed: Apr. 29, 2020

Related U.S. Application Data (60) Provisional application No. 62/840,463, filed on Apr. 30, 2019.

(51) Int. Cl.
| | | |
|---|---|---|
| *G01S 7/40* | (2006.01) | |
| *H01Q 3/26* | (2006.01) | |
| *G01S 13/89* | (2006.01) | |

(52) U.S. Cl.
CPC .......... *G01S 7/4008* (2013.01); *G01S 7/4021* (2013.01); *G01S 13/89* (2013.01); *H01Q 3/267* (2013.01); *G01S 7/4013* (2021.05)

(58) Field of Classification Search
CPC ...... G01S 7/4008; G01S 7/4021; G01S 13/89; G01S 7/4013; H01Q 3/267
See application file for complete search history.

(56) References Cited

U.S. PATENT DOCUMENTS

| | | | |
|---|---|---|---|
| 5,223,838 A | 6/1993 | Tang et al. | |
| 5,559,516 A * | 9/1996 | Didomizio | .......... G01S 13/9092 |
| | | | 342/147 |
| 7,408,507 B1 | 8/2008 | Paek et al. | |
| 9,019,153 B1 | 4/2015 | Schuss et al. | |

(Continued)

FOREIGN PATENT DOCUMENTS

| | | | | |
|---|---|---|---|---|
| CN | 108776330 A | * | 11/2018 | ........... G01S 7/4021 |
| CN | 108776330 A | | 11/2018 | |

OTHER PUBLICATIONS

Paulraj, A., et al., "Direction of Arrival Estimation By Eigenstructure Methods With Unknown Sensor Gain and Phase", 1985 IEEE, CH2118-8/85/0000-0640 (4 pp).

*Primary Examiner* — Peter M Bythrow
*Assistant Examiner* — Nazra Nur Waheed
(74) *Attorney, Agent, or Firm* — Young Basile Hanlon & MacFarlane, P.C.

(57) ABSTRACT

A method includes generating emitted signals using transmitter elements and measuring received signals using receiver elements. The received signals are reflected portions of the emitted signals and the received signals correspond to one or more targets. The method also includes applying a first matched filter to the received signals to determine range information for the received signals, filtering the received signals based on the range information to define filtered signals, and determining calibration parameters using the filtered signals. The method also includes correcting the received signals using the calibration parameters to define calibrated signals and determining angle of arrival information for the received signals using the calibrated signals.

17 Claims, 4 Drawing Sheets

(56) References Cited

U.S. PATENT DOCUMENTS

| | | | |
|---|---|---|---|
| 2007/0222671 A1* | 9/2007 | Nohmi | G01N 21/3581 342/142 |
| 2008/0185903 A1 | 8/2008 | Bausov et al. | |
| 2008/0218400 A1 | 9/2008 | Stolarczyk et al. | |
| 2011/0102261 A1* | 5/2011 | Egri | H01Q 1/28 342/368 |
| 2015/0331123 A1* | 11/2015 | Guigné | G01V 1/28 702/16 |
| 2016/0103212 A1* | 4/2016 | Nath | G01S 13/04 342/28 |
| 2016/0156100 A1* | 6/2016 | Sikina | H01Q 3/267 342/352 |
| 2016/0377714 A1* | 12/2016 | Masuda | G01S 13/56 342/28 |
| 2017/0153316 A1* | 6/2017 | Wintermantel | H03M 7/24 |
| 2020/0025866 A1* | 1/2020 | Gulati | G01S 7/0235 |

\* cited by examiner

CALIBRATION FOR MULTI-CHANNEL IMAGING SYSTEMS

CROSS-REFERENCE TO RELATED APPLICATIONS

This application claims the benefit of U.S. Provisional Application No. 62/840,463, filed on Apr. 30, 2019, the content of which is hereby incorporated in its entirety for all purposes.

TECHNICAL FIELD

This disclosure relates to calibration of radar systems.

BACKGROUND

Multi-channel time-of-flight imaging systems can provide estimates of range, velocity, and/or angle of arrival for reflecting targets that are located in their field of view. These types of systems are highly sensitive to minor variations, which may be static (e.g., manufacturing related) or may be dynamic (e.g., temperature related). These variations can result in gain and phase mismatch errors between channels, which can reduce the effectiveness of the imaging system.

SUMMARY

One aspect of the disclosure is a method that includes generating emitted signals using transmitter elements and measuring received signals using receiver elements. The received signals are reflected portions of the emitted signals and the received signals correspond to one or more targets. The method also includes applying a first matched filter to the received signals to determine range information for the received signals, filtering the received signals based on the range information to define filtered signals, and determining calibration parameters using the filtered signals. The method also includes correcting the received signals using the calibration parameters to define calibrated signals and determining angle of arrival information for the received signals using the calibrated signals.

The calibration parameters may include gain adjustment parameters for the transmitter elements and the receiver elements, and the calibration parameters may include phase adjustment parameters for the transmitter elements and the receiver elements. Determining the calibration parameters may include determining a difference between measured values and expected values.

Filtering the received signals based on the range information may be performed by excluding signals corresponding to distances that are lower than a first threshold value. Filtering the received signals based on the range information may be performed by excluding signals corresponding to distances that are higher than a second threshold value.

In some implementations, the method also includes applying a second matched filter to the received signals to determine doppler information for the received signals, wherein filtering the received signals is based further on the doppler information for the received signals.

In some implementations, measuring the received signals includes determining power and phase information for the received signals, wherein filtering the received signals is based further on the power and phase information for the received signals.

Another aspect of the disclosure is a method that includes generating emitted signals using transmitter elements and measuring received signals using receiver elements. The transmitter elements and the receiver elements define a multiple input, multiple output antenna array. The received signals are reflected portions of the emitted signals and the received signals correspond to one or more targets. Measuring the received signals includes determining power and phase information for the received signals. The method also includes applying transforms to the received signals to determine range information and doppler information, applying one or more modifications to the received signals to define modified signals, and determining calibration parameters using the modified signals. The method also includes correcting the received signals using the calibration parameters to define calibrated signals and determining angle of arrival information for the received signals using the calibrated signals.

Applying one or more corrections to the received signals to define the modified signals may include applying a correction factor to the received signals based on the range information. Applying one or more corrections to the received signals to define the modified signals may include applying weighting factors to the received signals based on at least one of the power and phase information, the range information, or the doppler information. Applying one or more corrections to the received signals to define the modified signals may include filtering the received signals based on at least one of the power and phase information, the range information, or the doppler information.

Applying transforms to the received signals to determine the range information and the doppler information may include applying a first matched filter to the received signals to determine the range information and applying a second matched filter to the received signals to determine the doppler information.

The calibration parameters may include gain adjustment parameters for the transmitter elements and the receiver elements, and the calibration parameters may include phase adjustment parameters for the transmitter elements and the receiver elements. Determining the calibration parameters may include determining a difference between measured values and expected values.

Another aspect of the disclosure is a system that includes a multiple input, multiple output antenna array and a signal processor. The multiple input, multiple output antenna array includes transmitter elements that are configured to generate emitted signals and receiver elements that are configured to measure received signals. The received signals are reflected portions of the emitted signals. The received signals correspond to one or more targets. The measurement of the received signals includes determining power and phase information for the received signals. The signal processor is configured to apply a first matched filter to the received signals to determine range information for the received signals, apply a second matched filter to the received signals to determine doppler information for the received signals, filter the received signals based on the power and phase information, the range information, and the doppler information to define filtered signals, and determine calibration parameters using the filtered signals. The signal processor is also configured to correct the received signals using the calibration parameters to define calibrated signals and to determine angle of arrival information for the received signals using the calibrated signals.

In some implementations of the system, the calibration parameters include gain adjustment parameters for the transmitter elements and the receiver elements, the calibration parameters include phase adjustment parameters for the transmitter elements and the receiver elements, and determining the calibration parameters includes determining a difference between measured values and expected values.

In some implementations of the system, the signal processor is configured to filter the received signals based on the range information, the power and phase information and the doppler information by excluding signals corresponding to distances that are lower than a first distance threshold value, by excluding signals corresponding to power levels that are lower than a first power level threshold value, and by excluding signals corresponding to velocities that are lower than a first velocity threshold value.

In some implementations of the system, the signal processor is configured to filter the received signals based on the range information, the power and phase information and the doppler information by excluding signals corresponding to distances that are higher than a second distance threshold value, by excluding signals corresponding to power levels that are higher than a second power level threshold value, and by excluding signals corresponding to velocities that are higher than a second velocity threshold value.

DETAILED DESCRIPTION

Some calibration techniques for imaging arrays directly measure the gain and phase of each array path. This can be done, for example, by placing the array in a test fixture that includes a translational stage. Gain and phase for each channel are measured independently using measurement probes that are placed around each element in the array. This technique is well suited to low frequency applications, which are less sensitive to timing, spatial position, and test equipment tolerances. Due to the use of a test fixture, this technique may not be suitable for in-situ calibration.

Some calibration techniques for imaging arrays capture raw data from an uncalibrated array. A mathematical model is used to estimate gain and phase errors between array elements. These techniques are sometimes referred to as auto-calibration methods because the system is calibrated using its existing signal pathways. These models are often tailored to a particular type of imaging system, and the models may be based on assumptions that are specific to the particular type of imaging system.

Gain and phase errors in a multi-channel array can be estimated by examining the linear relationship of time-domain sampled signals received by array elements caused by a plane wave (or multiple plane waves) incident to the array. This approach assumes that the incident signals are plane waves (e.g. caused by targets far from the imager), and any deviation from a true plane wave will result in a calibration error that corresponds to the actual phase profile of the incident wave. As a result, this approach unsuitable for in-situ calibration, as it works best under controlled circumstances (e.g., a dedicated calibration laboratory setup) in which reflection of signals can be controlled such that all incident signals closely approximate plane waves.

The systems and methods that are described herein belong to the class of calibration methods in which raw data is captured from an uncalibrated array. As will be described in detail, time-domain signals are transformed into a different space, which allows spatial filtering to be performed on the signals without loss of calibration information. This transformation eliminates the previously-described calibration error associated with assuming that all incident waves are plane waves by allowing signals to be filtered to disregard samples that originate far from the radar.

One example a transformation that can be applied to the time-domain signal is the Fourier transform. In the context of a frequency-modulated continuous wave (FMCW) radar, the Fourier transform of the time-domain signal provides range information about the targets seen by the radar. If the gain and phase errors are static over the course of a single radar measurement, they are not affected by the linear process of the Fourier transform. The transformed signals can then be processed using measurements from a desired set of ranges instead of using the entire time-domain series. This spatial filtering allows calibration to be performed under circumstances where some of the incident waves will emanate from nearby sources, and therefore not be plane waves, because spatial filtering removes these samples from the series so that calibration can be performed using only those samples that are known to have been reflected from targets that are far from the radar.

In addition to ensuring that calibration is performed using only plane waves, spatial filtering also provides an inherent estimate of the quality of the signal. Thus, instead of averaging time-domain samples to reduce noise, a weighted average of the time domain samples can be prepared by weighting the samples based on the incident signal power at each range. This provides a signal-to-noise advantage and reduces the error in the final result.

In addition, a coarse understanding of the source location (e.g., in the range dimension) of incident reflected signals can be used to determine a phase profile across the imaging array emerging from near-field effects. This phase profile can be used to correct for any remaining curvature resulting from an incident signal deviating from a plane wave, also resulting in a higher accuracy calibration.

Figure 1:
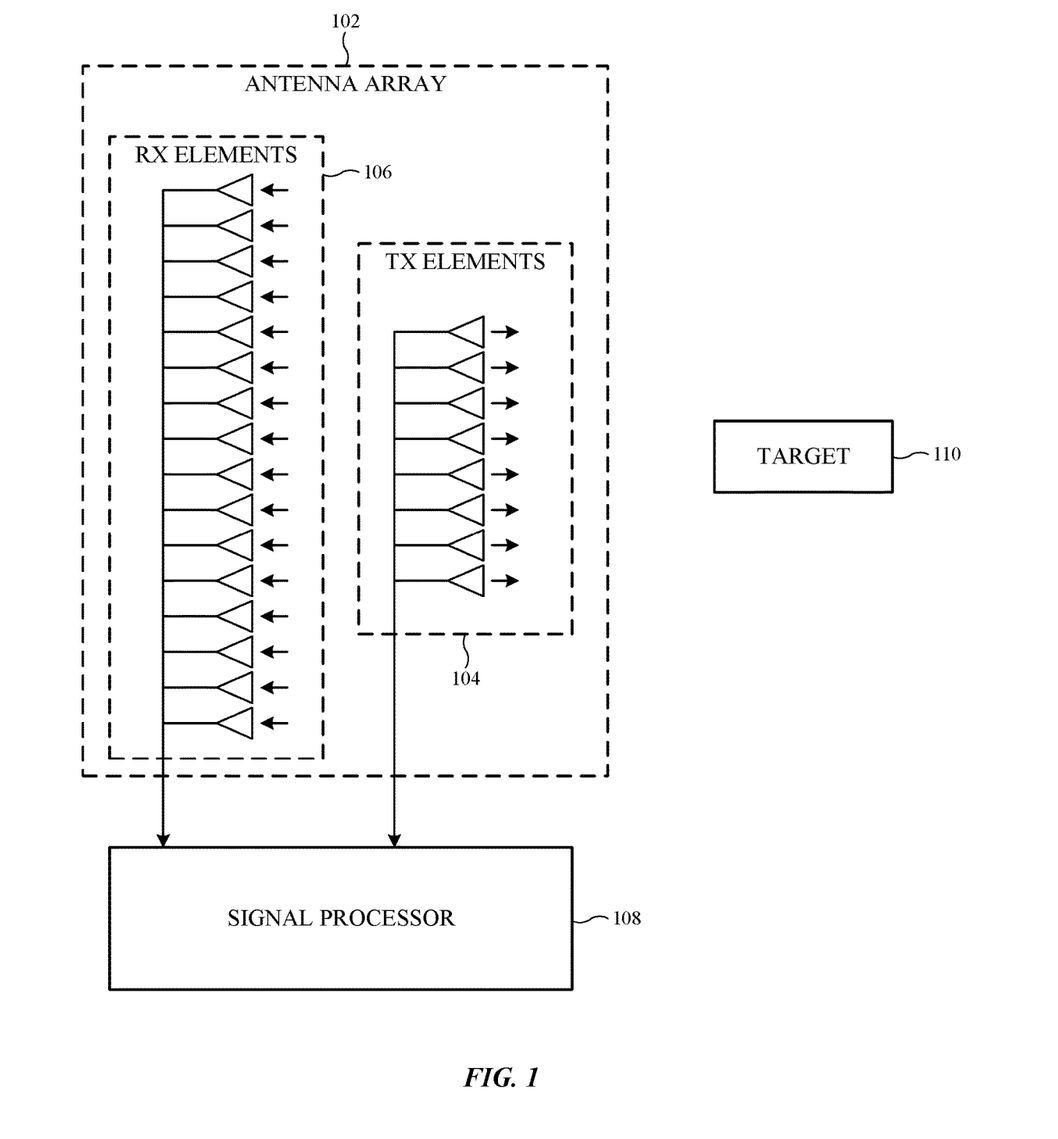
FIG. 1 is an illustration that shows an imaging radar system.

FIG. 1 is an illustration that shows an imaging radar system 100. The imaging radar system 100 is a multiple channel radar. The imaging radar system 100 may operate according to frequency-modulated continuous-wave (FMCW) radar principles using FMCW signals, or may operate using signals other than FMCW signals. In the illustrated example, the imaging radar system 100 includes an antenna array 102 having transmitter elements 104, receiver elements 106, and a signal processor 108.

The transmitter elements 104 of the antenna array 102 are operable to emit a signal. A portion of the emitted signal is incident upon one or more targets 110, causing a reflected portion of the signal to be directed back toward the antenna array 102. The reflected portions of the signal are then received by the receiver elements 106 and measured. The emitted signals are transmitted by the transmitter elements 104 at a transmission time, at a transmission power level, and at a transmission frequency. The received signals are measured by the receiver elements 106 including a receiving time, a receiving power level (e.g., a complex power level including the incident signal power and the phase angle of the reflected portion of the emitted signal), and a receiving frequency.

Each of the transmitter elements 104 defines a transmission channel by which signals are emitted and each of the receiver elements defines a receiver channel 106 by which signals are received. Each of the transmitter elements 104 will receive reflected signals originating from all of the transmitter elements 106, and the received signals can be decoded to identify their sources (e.g., using a multi-access orthogonalization scheme). This allows pairs of the transmitter elements 104 and the receiver elements 106 to define synthetic elements and corresponding synthetic channels. The transmitter elements 104 and the receiver elements 106 may be positioned to produce a desired synthetic array pattern. It should be understood, however, that the calibration techniques that are described herein can be applied to many different structural configurations and synthetic array patterns for the antenna array 102.

As an example, the imaging radar system 100 may be implemented as a one-hundred and twenty-eight synthetic channel 77 GHz radar having eight transmitter channels that each correspond to one of the transmitter elements 104 and sixteen receiver channels that each correspond to one of the receiver elements 106. The imaging radar system 100 could be implemented such that it has a different number of transmitter channels and/or receiver channels. The transmitter elements 104 and the receiver elements 106 may be controlled by one or more transceivers that are included in the signal processor 108. For example, the signal processor 108 may include four Monolithic Microwave Integrated Circuit (MMIC) transceivers that each have two transmitter channels and four receiver channels. The signal processor 108 may also include a computing device that is able to perform the operations and procedures that will be described herein.

Figure 2:
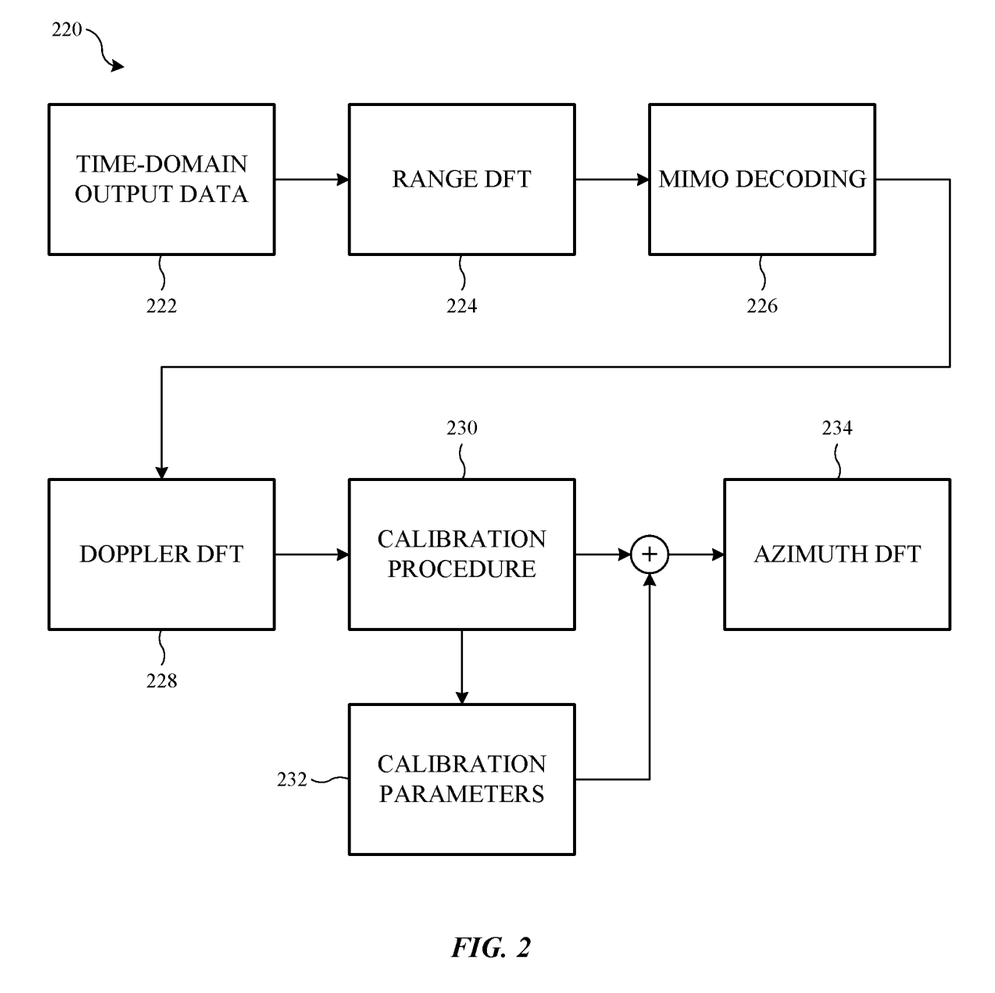
FIG. 2 is a block diagram that shows a signal processing operation.

FIG. 2 is a block diagram that shows a signal processing operation 220 that is performed by the signal processor 108 of the imaging radar system 100. In response to a signal that is transmitted by the transmitter elements 104 of the antenna array 102 the reflected portions of the signal that are received by the receiver elements 106, the signal processor 108 generates time-domain output data 222 that is provided to the signal processing operation 220 as an input.

In the implementations that are discussed herein, the time-domain output data 222 represents the received signals (i.e., the reflected portions of the emitted signals) that are measure by the receiver elements 106. As an example, the time-domain output data 222 includes time-domain samples per chirp, receiver channel, and chirp number. Other implementations that represent the received signals in different forms are possible and may include different outputs. The time-domain output data 222 is multi-dimensional data and may be modeled as a multi-dimensional array. In some implementations, the receiver channel data may include the sum of all of the incident transmitter signals.

In the illustrated example, processing of the time-domain output data 222 includes a range discrete Fourier transform (DFT) 224, multiple input, multiple output (MIMO) decoding 226, a doppler DFT 228, a calibration procedure 230 that generates calibration parameters 232, and an azimuth DFT 234. It should be understood that the range DFT 224, the doppler DFT 228, and the azimuth DFT 234 are examples of filters, and the functions performed by them can be implemented using matched filters or other filters.

First, the range DFT 224 is taken across the samples (e.g., two-hundred and fifty-six samples) for each chirp. The range DFT 224 provides information as to the range of the targets 110 from the antenna array 102. The processing performed by the range DFT 224 can, more generally, be implemented using a matched filter (i.e., a first matched filter) After the range DFT 224, the MIMO decoding 226 is performed to decode the MIMO coding scheme by multiplying each receiver signal by each transmitter code sequence. The MIMO decoding 226 utilizes the signals transmitted by the transmitter elements 104 and the signals received by the receiver elements 106 to define signals that each correspond to a respective synthetic element that is defined by one of the transmitter elements 104 and one of the receiver elements 106, with the number of synthetic elements therefore being the product of the number of the transmitter elements 104 and the number of the receiver elements 106. Thus, in the present example, the MIMO decoding 226 expands the output data (e.g., into a multi-dimensional array with dimensions of range frequency, synthetic channel, and chirp number). The decoded output data is transformed by the doppler DFT 228, which is taken across chirps to resolve radial velocity. The output of the doppler DFT 228 includes velocity information for the signals, representing the velocities of their respective targets. The processing performed by the doppler DFT 228 can, more generally, be implemented using a matched filter (i.e., a second matched filter)

The calibration procedure 230 preprocesses the time-domain output data 222 based on the power and phase information, range information, and the velocity information for the received signals and can apply modifications prior to using the time-domain output data 222 to determine the calibration parameters 232. The modifications can include filtering to exclude signals having power, range, or doppler values outside of desired ranges (i.e., above or below threshold values correspond to upper and lower boundaries of the desired ranges). The modifications can include changing the signals, for example, to correct a circular wave shape associated with a close target to a plane wave. The modifications can include applying weighting to the signals based on power, range and doppler values (e.g., based on deviations from predetermined values). The modifications can include using a combination of power, range, and doppler filtering to identify signals that all correspond to a single target and exclude other signals from use in calibration.

As will be explained herein, the calibration procedure then uses the filtered signals to determine expected values for gain and phase for each of the transmitter elements 104 and each of the receiver elements, and to compare the expected values to the measure values. Expected values are those values that would be measured for an ideal signal (e.g., a plane wave). The differences between these values can then be used as the calibration parameters 232 or can be used to adjust the calibration parameters 232, such as by filtering over time.

The calibration procedure 230 is typically not performed during every iteration of the signal processing operation 220. Instead, the calibration procedure 230 can be performed in response to satisfaction of one or more conditions, such as passage of a time interval, passage of a predetermined number of iterations of the signal processing operation 220 or sensing of a physical condition that affects the imaging radar system 100, such as a change in temperature of one or more components of the imaging radar system 100.

The calibration parameters 232 that are generated by the calibration procedure 230 are added to the outputs of the doppler DFT. The calibration parameters may be applied either in hardware (e.g., with phase shifters) or in post-processing (e.g., with complex multipliers). The calibrated values are passed to the azimuth DFT 234. The azimuth DFT 234 is taken across the synthetic channels to resolve angle of arrival. Note, azimuth DFT 234 is an example of a beamforming operation. Other beamforming techniques can be used.

Calibration is performed to determine gain errors affecting each of the synthetic channels. The gain errors may be caused by a number of physical and environmental factors, such as trace length mismatch, MMIC mismatch, or antenna mismatch.

The far-field signal (i.e. resulting from plane waves) that is received by the $i^{th}$ synthetic element can be modeled according to Equation 1:

$$x_i = \Psi_i e^{j\phi_i} \sum_{k \in K} \alpha_k e^{j\omega_{k,offset}+(i-1)\omega_k} \quad (1)$$

In Equation 1, the variable i represents an index value assigned to each of the synthetic array element (e.g., a value of 1-128 in the current example). The variable $x_i$ represents a complex sample that is taken at a particular range/doppler cell, a corresponds to the $i^{th}$ synthetic element. The variable $\Psi_1$ represents the gain mismatch corresponding to synthetic element i. The variable $\phi_i$ represents the phase mismatch corresponding to synthetic element i. The variable K represents the number of plane waves received. The variable $\alpha_k$ represents the gain associated with the $k^{th}$ plane wave. The variable $\omega_{k,offset}$ represents the global phase offset associated with the $k^{th}$ plane wave. The variable $\omega_k$ represents the linear slope across the synthetic array due to the angle of arrival of the $k^{th}$ plane wave.

It is assumed that calibration is performed using a single boresight target for calibrating, and as such there is no linear phase profile across the array due to the target angle of arrival. The incident signal is assumed to be of high signal-to-noise ratio (e.g., no strong effect due to multipath or other interferers). The calibration parameters are assumed to be independent of frequency (e.g., operation at 76-76.2 GHz should have the same calibration parameters as operation at 76.8-77 GHz). Calibration parameters are assumed to be independent of angle of arrival. Calibration parameters for a radar are assumed to have a slow time-constant (i.e., calibration holds for enough time to be usable in the field). It is also assumed that the calibration problem can be decomposed into two linearly-dependent problems (gain and phase) that can be solved separately.

Based on the foregoing assumptions, Equation 1 can be simplified into Equation 2:

$$x_i = \Psi_i e^{j\phi_i} \alpha e^{j\omega_{offset}} \quad (2)$$

Note that for the single-target boresight case $\omega_k=0$ and the resulting plane-wave gain and phase are common to all synthetic elements (independent of i). This form will be assumed for all future derivations.

The gains of the synthetic elements $\Psi_i$ are recovered using the covariance matrix R calculated by the vector x and its complex transpose $x^H$ as shown in Equation 3 and in Equation 4 with elements i and j:

$$R = xx^H \quad (3)$$

$$R_{i,j} = \alpha^2 (\Psi_i \Psi_j) e^{j(\phi_i - \phi_j)} \quad (4)$$

Looking at the main diagonal of R(i=j) gives Equation 5:

$$R_{i,i} = \alpha^2 \Psi_i^2 \quad (5)$$

In Equation 6, we define $\mu_i$:

$$\mu_i = \ln\left|\frac{R_{i,i}}{R_{i+1,i+1}}\right| \forall i \in [1, 127] \quad (6)$$

$$= \ln\left|\frac{\alpha^2 \Psi_i^2}{\alpha^2 \Psi_{i+1}^2}\right|$$

$$= 2\ln|\Psi_i| - 2\ln|\Psi_{i+1}|$$

All gain terms $\Psi$ can be solved for according to Equation 7:

$$\mu = \prod \Psi \quad (7)$$

where $$\mu = (\mu_1, \mu_2, \ldots, \mu_{127})$$

$$\Pi = \begin{bmatrix} 2 & -2 & 0 & \ldots & 0 & 0 \\ 0 & 2 & -2 & \ldots & 0 & 0 \\ \ldots & \ldots & \ldots & \ldots & \ldots & \ldots \\ 0 & 0 & 0 & \ldots & 2 & -2 \end{bmatrix}$$

$$\Psi = (\ln(\Psi_1), \ln(\Psi_2), \ldots, \ln(\Psi_{128}))^T$$

The projection matrix Π in Equation 7 is not full rank (i.e., it includes one-hundred and twenty-seven equations for one-hundred and twenty-eight unknowns). The dimensionality of the problem can be reduced by expressing each synthetic channel as a product of the transmitter (TX) and receiver (RX) gains $\Psi_{TX,i}$ and $\Psi_{RX,i}$ that make up that channel, as per Equation 8.

$$\Psi_i = \Psi_{TX,i} = \Psi_{RX,i} \quad (8)$$

$$\ln(\Psi_i) = \ln(\Psi_{TX,i}) + \ln(\Psi_{RX,i})$$

To reduce the number of degrees of freedom to be solved, a MIMO structure matrix can be defined that decomposes synthetic elements into their constituent TX and RX elements. In addition, Additionally, we define a vector $\Psi'$ (e.g., a 24×1 vector in this example) that is defined as per Equation 9:

$$\Psi' = (\ln(\Psi_{TX,i}), \ldots, \ln(\Psi_{TX,8}), \ln(\Psi_{RX,1}), \ldots, \ln(\Psi_{RX,16}))^T \quad (9)$$

A least squares formulation can be used to solve for $\Psi'$, as per Equation 10:

$$\mu = \Pi A \Psi' \quad (10)$$

Without loss of generality, the conditions $\Psi_{TX,1}=1$ and $\Psi_{RX,1}=1$ can be added to the least-squares problem. This results in the projection matrix ΠA having dimensions of 129×24 and rank 24. Once the vector $\Psi'$ is estimated, the linear gains are recovered by taking the exponential of the log form solution.

Phases for the synthetic elements $\phi_i$ are determined using a linear model. To determine the phases of the synthetic elements $\phi_i$, the angle of each synthetic element is first written as in Equation 11.

$$\sphericalangle x_i = \phi_i + \omega_{offset} \quad (11)$$

To within a constant value $\omega_{offset}$ this equation can be solved directly by noting that the phase of each synthetic element is the sum of the phases of its TX and RX elements as in Equation 12.

$$\sphericalangle x_i = \phi_{TX,i} + \phi_{RX,i} + \omega_{offset} \quad (12)$$

Then the least squares problem can be written as shown in Equation 13.

$$\sphericalangle x_i = A\phi' \quad (13)$$

Using the same MIMO matrix that was used during gain determination, we define a vector (e.g., a 24×1 vector in this example) having the form shown in Equation 14.

$$\phi = (\ln(\phi_{TX,1}), \ldots, \ln(\phi_{TX,8}), \ln(\phi_{RX,1}), \ldots, \ln(\phi_{RX,16}))^T \quad (14)$$

The linear formulation described above requires that the sums of the angles stay in the bounds $[-\pi, \pi]$. More specifically, the angle function does not provide a unique solution due to the modulo nature of phase. Thus, the phases are constrained to be small, correct results are obtained using the linear formulation.

The phase of the system cannot be constrained such that $\phi_{TX,i} + \phi_{RX,i}$ always remains within the bounds $[-\pi, \pi]$. This limitation can be overcome by an iterative method that starts from an initial estimate of $\hat{\phi}' = 0$. Each iteration generates a new observed phase vector $\sphericalangle \tilde{x} = \sphericalangle x - A\hat{\phi}'$. The linear least-squares problem is then solved using the observed phase vector $\sphericalangle \tilde{x}$. The solution to the linear least-squares problem is then added to the phases $\hat{\phi}'$. Further iterations of this process are performed until the phases $\hat{\phi}'$ converge. This process will converge to the correct solution as long as the initial estimate is close enough to the correct phase terms to ensure that $\phi_{TX,i} + \phi_{RX,i}$ remains within the bounds $[-\pi, \pi]$.

Figure 3:
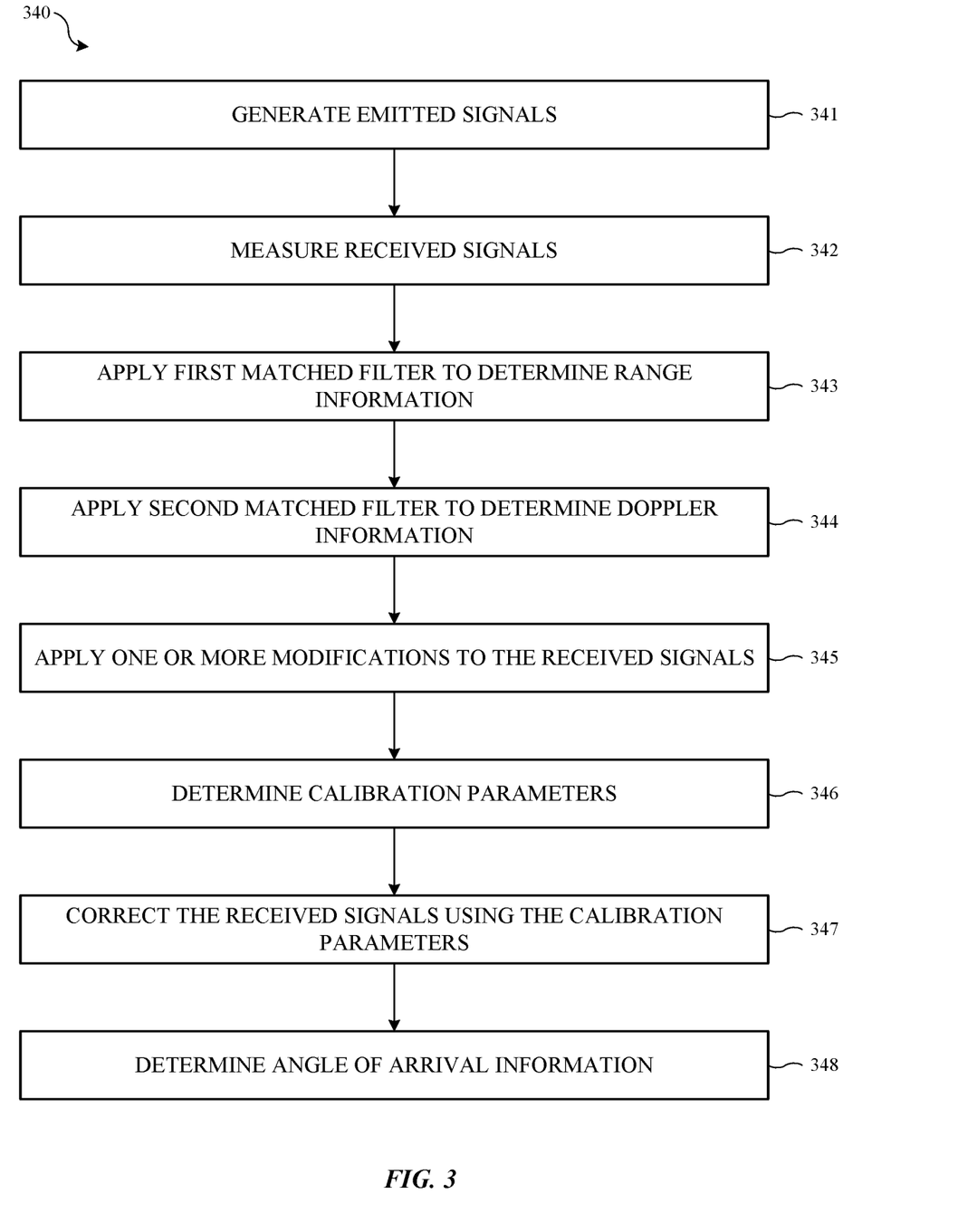
FIG. 3 is a flowchart that shows a calibration process.

FIG. 3 is a flowchart that shows a calibration process 340. The calibration process 340 may be performed by the imaging radar system 100 in the context of the calibration procedure 230 of the signal processing operation 220. The descriptions of the imaging radar system 100 and the signal processing operation 220 are incorporated in the calibration process 340 by reference. The calibration process 340 may be performed under the control of a computing device, which may include conventional components such as a memory device that includes program instructions and a processor that is configured to execute the program instructions, wherein the program instructions, when executed by the processor, cause the processor to perform the operations of the calibration process 340. As an example, such a computing device may be included in the signal processor 108. The calibration process 340 may also be embodied in the form of a non-transitory computer-readable storage device that includes the program instructions.

The calibration process 340 may be performed using a radar system. The radar system that is used to implement the calibration process 340 may be a multiple input, multiple output radar system, such as the imaging radar system 100. The calibration process 340 will be described herein with reference to components of the imaging radar system 100, including the antenna array 102, the transmitter elements 104, the receiver elements 106, and the signal processor 108. Other radar system configuration may be used to implement the calibration process 340.

In operation 341, the transmitter elements 104 are used to generate emitted signals. The emitted signals may be frequency-modulated carrier wave signals. Information describing the time, power, and frequency of the emitted signals is recorded for each of the transmitter elements 104 for use during signal processing.

The emitted signals are incident upon one or more of the targets 110, which causes a portion of the emitted signals to be reflected back to the antenna array 102. The reflected portions of the emitted signals that are incident upon the antenna array 102 are referred to herein as received signals. The received signals therefore correspond to one or more of the targets 110.

Operation 342 includes measuring the received signals using the receiver elements 106 of the antenna array 102. Measuring the received signals includes determining power and phase information (i.e., magnitude and phase) for the received signals. Information describing the time, power, and frequency of the received signals is recorded for each of the receiver elements 106 for use during signal processing.

The calibration process 340 includes applying one or more transforms to the received signals (i.e., to the information that describes the received signals, such as the time-domain output data 222). As examples, transforms may be applied to determine range information for the received signals and to determine doppler information for the received signals.

In the illustrated example, operation 343 includes applying a first matched filter to the received signals to determine range information for the received signals. The first matched filter may be a discrete Fourier transform. Operation 343 can be implemented as described with respect to the signal processing operation 220 and the range DFT 224. Operation 344 includes applying a second matched filter to the received signals to determine doppler information (i.e., velocity information describing velocity of the target the signal was reflected from) for the received signals. The second matched filter may be a discrete Fourier transform. Operation 343 may be implemented as described with respect to the signal processing operation 220 and the doppler DFT 228.

The calibration process 340 also includes applying one or more modifications to the received signals in operation 345 to define modified signals that are used during calibration. The modifications are applied to exclude signals corresponding to targets that provide poor data for calibration. As one example modifications to the received signals can exclude signals reflected from targets that are too close, such that the returned signals do not approximate a plane wave, or too far away, such that the returned signals are of relatively low power. As another example, modifications to the received signals can correct data from such targets, for example, by correcting received signals corresponding to a close target such that the received signals better approximate a plane wave. As another example, modifications to the received signals can apply weights to the received signals. For example, weighting can be performed based on a difference between values for power, distance, or velocity and predetermined values for those characteristics.

In some implementations of the calibration process 340, operation 345 includes filtering the received signals based on the range information. Filtering the received signals based on range information may be performed by excluding signals corresponding to distances that are lower than a first threshold value and/or excluding signals corresponding to distances that are higher than a second threshold value.

In some implementations of the calibration process 340, operation 345 includes filtering the received signals based on the doppler velocity information. Filtering the received signals based on the doppler velocity information may be performed by excluding signals corresponding to velocities that are lower than a first threshold value and/or excluding signals corresponding to velocities that are higher than a second threshold value.

In some implementations of the calibration process 340, operation 345 includes filtering the received signals based on the power and phase information. Filtering the received signals based on the power and phase information may be performed by excluding signals corresponding to power levels that are lower than a first threshold value and/or excluding signals corresponding to power levels that are higher than a second threshold value.

In some implementations of the calibration process 340, operation 345 includes applying a correction factor to the received signals based on the range information. A correction factor based on the range information can account for deviation of the incident wave from a plane wave using a coarse understanding of the source location of incident reflected signal to determine an expected phase profile across the receiver elements 106 of the antenna array 102. The expected phase profile can be used to correct for any remaining curvature resulting from an incident signal deviating from a plane wave.

In some implementations of the calibration process 340, operation 345 includes applying weighting factors to the received signals based on at least one of the power and phase information, the range information, or the doppler information. In some implementations of the calibration process 340, operation 345 includes filtering the received signals based on at least one of the power and phase information, the range information, or the doppler information.

Operation 346 includes determining calibration parameters using the modified signals resulting from the modifications applied in operation 345. Determining the calibration parameters may be performed in the manner described with respect to the signal processing operation 220 and the calibration procedure 230. The calibration parameters may include gain adjustment parameters (i.e., positive or negative values to be added to measured gain values) for the transmitter elements and the receiver elements, and the calibration parameters may include phase adjustment parameters (i.e., positive or negative values to be added to measured phase values) for the transmitter elements and the receiver elements. Determining the calibration parameters may include determining a difference between measured values and expected values, for example, using the least squares method as described with respect to the calibration procedure 230.

Operation 347 includes correcting the received signals using the calibration parameters to define calibrated signals. As an example, gain and phase adjustment values can be added to measured gain and phase values for each of the transmitter channels and each of the receiver channels (or to each of the synthetic channels based on combined gain and phase adjustment values for the respective transmitter and receiver channels).

Operation 348 includes determining angle of arrival information for the received signals using the calibrated signals. Operation 348 may be performed in the manner described with respect to the azimuth DFT 234.

The values determined for the targets, such as range, doppler velocity, and angle of arrival, can be output and used by another system, such as a control system that controls motion of a machine based on the sensed locations of the targets.

Figure 4:
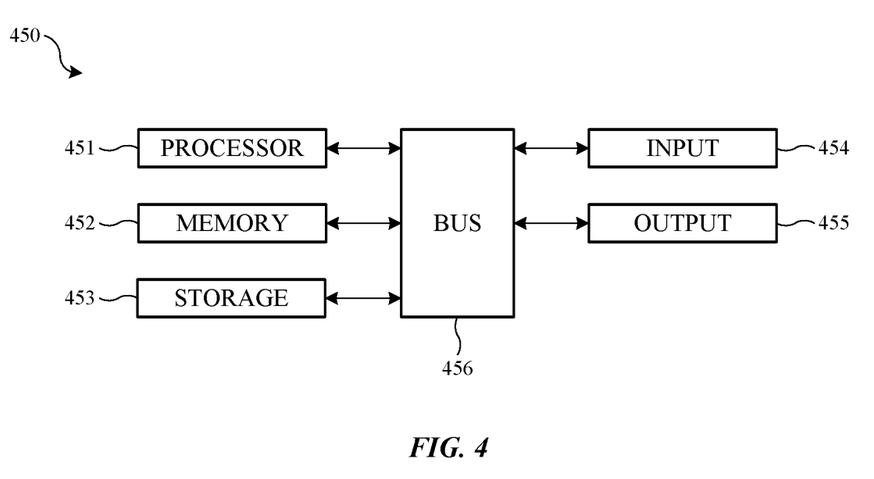
FIG. 4 is a block diagram that shows an example of a hardware configuration for a computing device.

FIG. 4 is a block diagram that shows an example of a hardware configuration for a computing device that can be used to implement the systems described herein. The computing device 450 may include a processor 451, a memory 452, a storage device 453, one or more input devices 454, and one or more output devices 455. The computing device 450 may include a bus 456 or a similar device to interconnect the components for communication. The processor 451 is operable to execute computer program instructions and perform operations described by the computer program instructions. As an example, the processor 451 may be a conventional device such as a central processing unit. The memory 452 may be a volatile, high-speed, short-term information storage device such as a random-access memory module. The storage device 453 may be a non-volatile information storage device such as a hard drive or a solid-state drive. The input devices 454 may include any type of human-machine interface such as buttons, switches, a keyboard, a mouse, a touchscreen input device, a gestural input device, or an audio input device. The output devices 455 may include any type of device operable to provide an indication to a user regarding an operating state, such as a display screen or an audio output.

What is claimed is:

1. A method, comprising:
generating emitted signals using transmitter elements;
measuring received signals using receiver elements, wherein the received signals are reflected portions of the emitted signals and the received signals are reflected from one or more targets, wherein at least one of the received signals deviates from a plane wave;
applying a first matched filter to the received signals to determine range information for the received signals;
filtering the received signals based on the range information to obtain filtered signals;
modifying the filtered signals by applying weights based on a difference between values for power, distance, and velocity, and predetermined values for power, distance, and velocity;
determining calibration parameters using the modified filtered signals;
correcting the received signals using the calibration parameters to define calibrated signals; and
determining angle of arrival information for the received signals using the calibrated signals;
wherein filtering the received signals based on the range information comprises removing signals corresponding to distances that are lower than a first threshold value and higher than a second threshold value.

2. The method of claim 1, wherein the calibration parameters include gain adjustment parameters for the transmitter elements and the receiver elements.

3. The method of claim 2, wherein the calibration parameters include phase adjustment parameters for the transmitter elements and the receiver elements.

4. The method of claim 1, wherein determining the calibration parameters includes determining a difference between measured values and expected values.

5. The method of claim 1, further comprising:
applying a second matched filter to the received signals to determine doppler information for the received signals, wherein filtering the received signals is based further on the doppler information for the received signals.

6. The method of claim 1, wherein measuring the received signals includes determining power and phase information for the received signals, wherein filtering the received signals is based further on the power and phase information for the received signals.

7. A method, comprising:
generating emitted signals using transmitter elements;
measuring received signals using receiver elements, wherein the transmitter elements and the receiver elements define a multiple input, multiple output antenna array, and the received signals are reflected portions of the emitted signals and the received signals correspond to one or more targets, and measuring the received signals includes determining power and phase information for the received signals;
applying transforms to the received signals to determine range information and doppler information;

applying one or more corrections to the received signals to define modified signals, wherein at least one of the received signals deviates from a plane wave and the modified signals approximate a plane wave, wherein applying one or more corrections to the received signals to define the modified signals includes applying weighting factors to the received signals based on a difference between values for the power and phase information, the range information, and the doppler information, and predetermined values for the power and phase information, the range information, and the doppler information;

determining calibration parameters using the modified signals;

correcting the received signals using the calibration parameters to define calibrated signals; and determining angle of arrival information for the received signals using the calibrated signals.

8. The method of claim 7, wherein applying one or more corrections to the received signals to define the modified signals includes applying a correction factor to the received signals based on the range information.

9. The method of claim 7, wherein applying one or more corrections to the received signals to define the modified signals includes filtering the received signals based on at least one of the power and phase information, the range information, or the doppler information.

10. The method of claim 7, wherein applying transforms to the received signals to determine the range information and the doppler information includes applying a first matched filter to the received signals to determine the range information and applying a second matched filter to the received signals to determine the doppler information.

11. The method of claim 7, wherein the calibration parameters include gain adjustment parameters for the transmitter elements and the receiver elements.

12. The method of claim 11, wherein the calibration parameters include phase adjustment parameters for the transmitter elements and the receiver elements.

13. The method of claim 7, wherein determining the calibration parameters includes determining a difference between measured values and expected values.

14. A system, comprising:
a multiple input, multiple output antenna array that includes transmitter elements that are configured to generate emitted signals and receiver elements that are configured to measure received signals, the received signals are reflected portions of the emitted signals, the received signals correspond to one or more targets, measurement of the received signals includes determining power and phase information for the received signals; and a signal processor that is configured to:
apply a first matched filter to the received signals to determine range information for the received signals, apply a second matched filter to the received signals to determine doppler information for the received signals, filter the received signals based on the power and phase information, the range information, and the doppler information to define filtered signals, determine calibration parameters using the filtered signals, correct the received signals using the calibration parameters to define calibrated signals, wherein correcting the received signals includes applying weighting factors to the received signals based on a difference between values for the power and phase information, the range information, and the doppler information, and predetermined values for the power and phase information, the range information, and the doppler information, and determine angle of arrival information for the received signals using the calibrated signals.

15. The system of claim 14, wherein the calibration parameters include gain adjustment parameters for the transmitter elements and the receiver elements, the calibration parameters include phase adjustment parameters for the transmitter elements and the receiver elements, and determining the calibration parameters includes determining a difference between measured values and expected values.

16. The system of claim 14, wherein the signal processor is configured to filter the received signals based on the range information, the power and phase information and the doppler information by excluding signals corresponding to distances that are lower than a first distance threshold value, by excluding signals corresponding to power levels that are lower than a first power level threshold value, and by excluding signals corresponding to velocities that are lower than a first velocity threshold value.

17. The system of claim 16, wherein the signal processor is configured to filter the received signals based on the range information, the power and phase information and the doppler information by excluding signals corresponding to distances that are higher than a second distance threshold value, by excluding signals corresponding to power levels that are higher than a second power level threshold value, and by excluding signals corresponding to velocities that are higher than a second velocity threshold value.

* * * * *